May 13, 1941. J. D. RUST 2,241,423
SELF-PROPELLED COTTON PICKING MACHINE
Filed Aug. 25, 1937  3 Sheets-Sheet 1
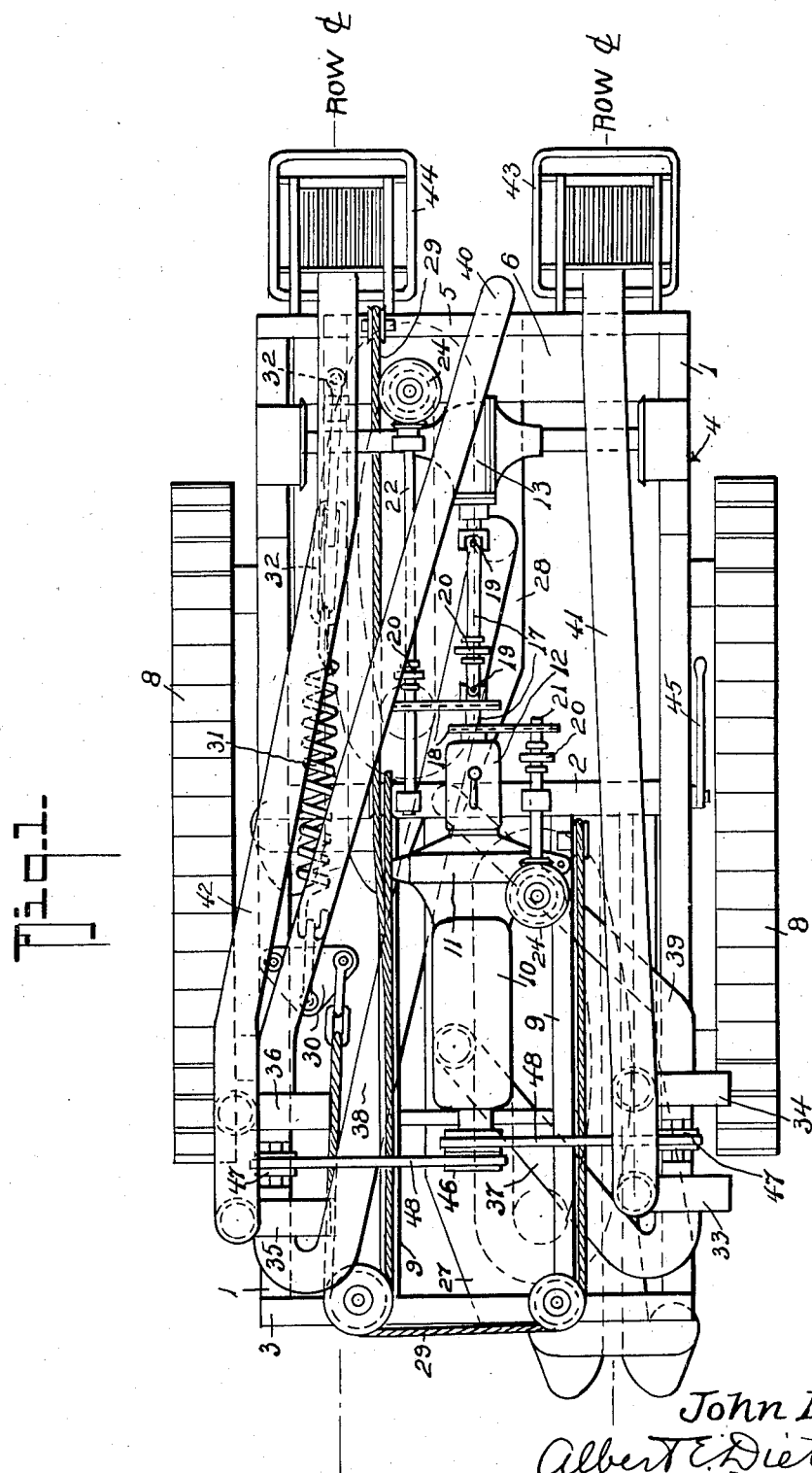
Inventor
John D. Rust
Albert E. Dieterich
By Theodore H. Rutley
Attorneys

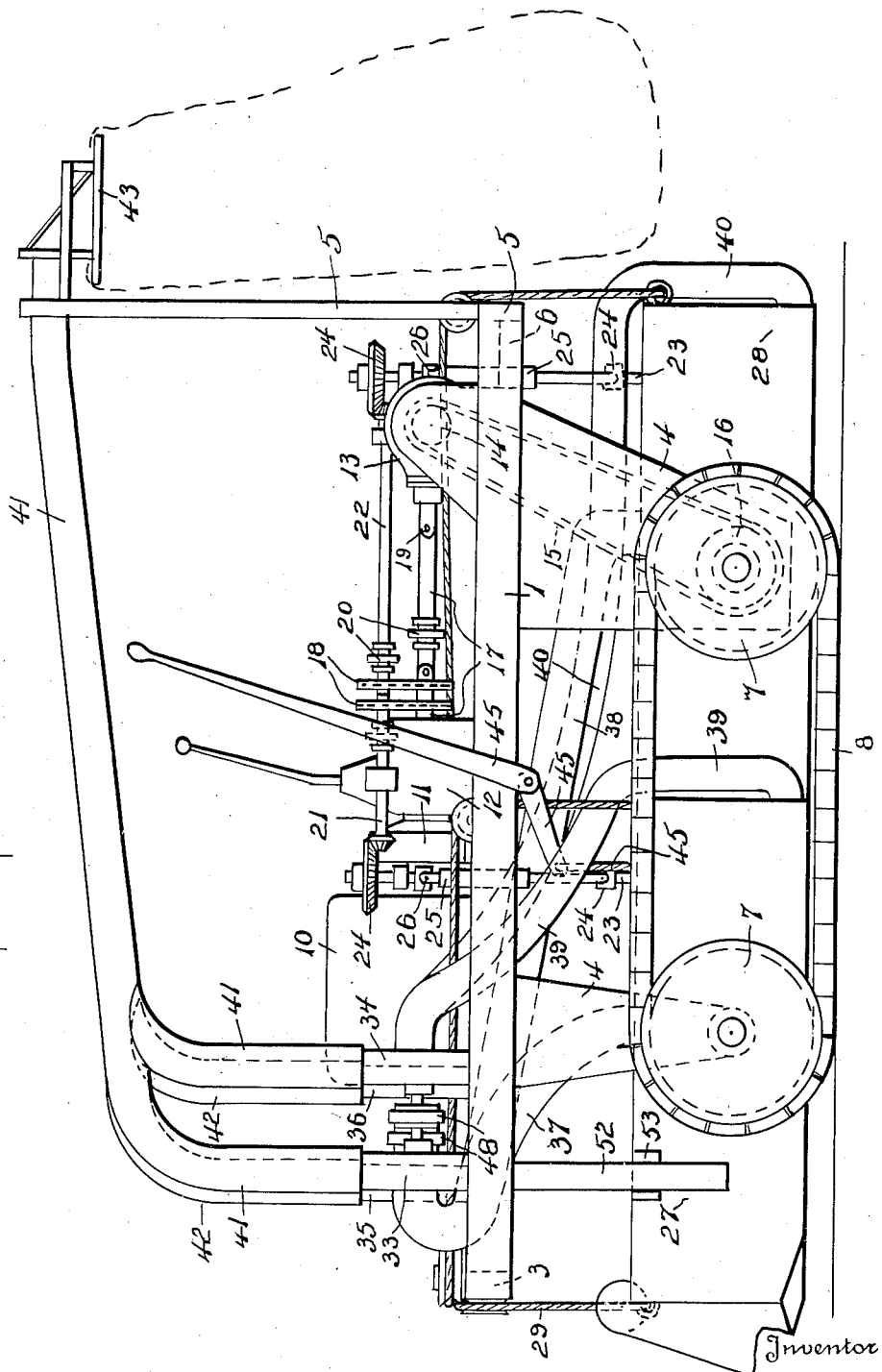

May 13, 1941.   J. D. RUST   2,241,423
SELF-PROPELLED COTTON PICKING MACHINE
Filed Aug. 25, 1937    3 Sheets-Sheet 3
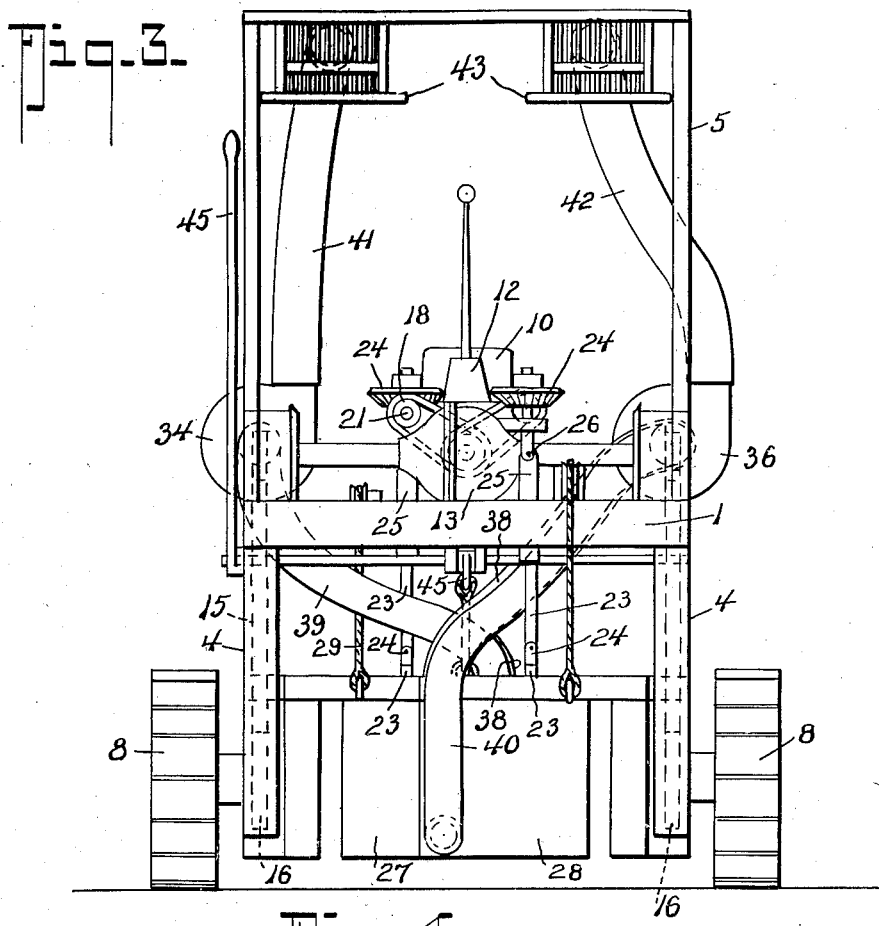
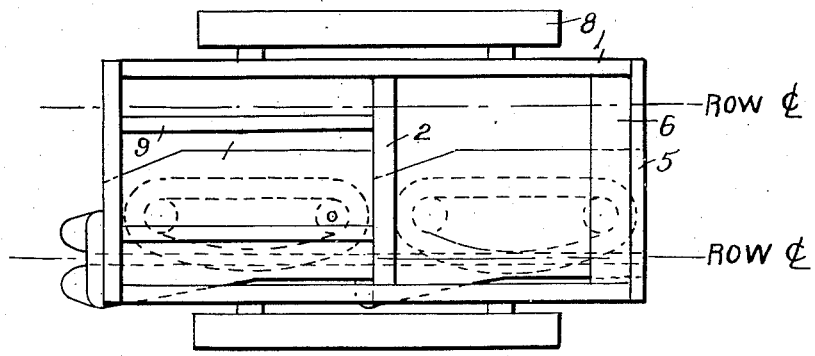
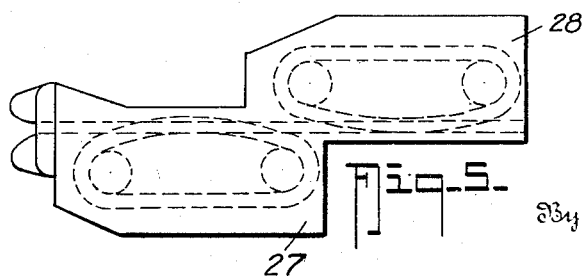
Inventor
John D. Rust
Albert E. Dieterich
and
By Theodore H. Rutley
Attorneys.

Patented May 13, 1941

2,241,423

UNITED STATES PATENT OFFICE

2,241,423

SELF-PROPELLED COTTON PICKING MACHINE

John D. Rust, Memphis, Tenn.

Application August 25, 1937, Serial No. 160,926

1 Claim. (Cl. 56—14)

My invention relates to machines for gathering cotton from the plants, and it particularly has reference to machines of the types disclosed in the following Letters Patent to myself and Mack D. Rust: No. 1,894,198, Jan. 10, 1933; Reissue No. 14,911, Jan. 1, 1935; No. 2,023,491, Dec. 10, 1935; No. 2,058,513, Oct. 27, 1936; No. 2,058,514, Oct. 27, 1936, and No. 2,073,653, Mar. 16, 1937.

More particularly, the invention relates to those pickers which include a tractor designed to straddle two rows of plants, the picking unit or units being suspended from the tractor, or otherwise suitably mounted thereon.

The present invention has for an object to provide a cotton picking machine composed of a high frame tractor on the frame of which the engine, transmission and differential drive shafts are located and beneath which frame the cotton picking units are located; and further to provide such a tractor which may be converted from a track-type to a wheel-type machine, and vice versa, without changing the mechanism mounted on the frame.

Further, it is an object to provide a cotton picking machine whose picking units may be removed and the tractor (either wheel or track type) may be used for various other purposes, such as drawing away plows, cultivators, and the like.

A further object is to provide a double unit machine with a right hand and a left hand unit that may be arranged either in one row tandem position and carried under the axle of the tractor as illustrated in the accompanying drawings, or arranged for a two row machine similar to the one illustrated in Patent No. 1,894,198, issued to J. D. Rust et al.

Field experience has shown that the unit, on being passed once along a row of cotton, does not remove all the available cotton under all conditions, making it necessary to pass the machine a second time over the rows of plants. It is one of the objects of the present invention to overcome this deficiency so that a single trip of the machine will remove practically all of the cotton from the plants. This I accomplish by providing two picking units and connecting them, either in tandem to act on one row at a time, or by using two units, one behind the other to act on two rows of plants at a time; in the latter event the machine may be so manipulated that one unit always acts on a fresh row, while the other unit goes over the row previously picked to gather the cotton missed by the first unit.

Further, the invention has for an object to provide a tractor, for use with cotton picking units, of such construction that one or more picking units may be mounted beneath the frame in any desired position, for example, on the wheel-type tractor a right and a left picking unit may be mounted for a two row machine similar to the arrangement shown in Fig. 2 of Patent No. 1,894,198, or the units may be mounted in tandem one behind the other, or a single unit may be mounted beneath the front or beneath the rear of the frame, etc.

A further object of the invention is to provide a boll crusher attachment at the entrance of the second unit for breaking the unopened bolls after frost; with this arrangement the front unit will gather the well-opened cotton and the boll crusher will break open the cracked and unopened bolls so that the lint can be wound up on the spindles of the rear unit.

A further object is to provide a self-propelled machine comprising cotton picking mechanism combined with a tractor designed to straddle two rows of plants and having a wide frame of sufficient height to allow the picking mechanism to be carried underneath the body of the tractor.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claim, reference being had to the accompanying drawings, in which—

Figure 1 is a plan view of one form of the invention, the tractor being arranged as a track type machine, parts of the tractor, such as the driver's seat, steering controls, fuel and water tanks, radiator, etc., being omitted for purposes of clarity of illustration, such parts being conventional.

Figure 2 is a side elevation of the same.

Figure 3 is a rear elevation of the same.

Figure 4 is a diagrammatic plan view of a modification, later referred to.

Figure 5 is a diagrammatic plan view of a further modification of the invention.

In the drawings, in which like numbers of reference indicate like parts in all the figures, 1 represents the side beams of the main frame of the tractor, 2 the intermediate cross beam, 3 the front cross beam, 6 the rear cross beam and 5 the support for the bag holders 43.

The machine has supports 4 on which are mounted the wheels 7 of the track 8, the latter being of any approved type, such, for example, as the "Caterpillar."

The engine 10 is carried on supplemental frame bars 9. The flywheel and clutch housing is indicated by 11, and the transmission gear box by 12.

The tracks are driven through sprockets 16 and chains 15 from driving sprockets 14 on the axles of the differential mechanism 13. Power is transmitted from the transmission gear mechanism 12 to the differential 13 through a shaft 17.

The foregoing comprise the principal parts of an elevated frame tractor designed to straddle two rows of plants.

The picking or gathering units 27 and 28 are carried beneath the frame of the tractor. The units 27 and 28 are each of substantially the same construction save that one is a right and one is a left.

In general, each unit 27 and 28 may include a housing within which is the necessary mechanism for picking the cotton from a row of plants. Each housing has a longitudinal passage at one side thereof to receive the plant row, and contains the picking spindles rotatably mounted in and carried by an endless spindle carrier which travels in a longitudinally elongated path that bulges toward the plants of the row being picked. Through the horizontal spaces between the stalk guards, which form one wall of the housing, the spindles project into and across the plant receiving passage. The motion of the spindle carrier, due to the shape of the path it follows, causes the spindles uniformly to penetrate the plants for the picking operation and to be gradually withdrawn therefrom as the picking is finished.

Rotation of the picking spindles while in contact with the plants is effected, incident to the movement of the endless spindle carrier, by means of frictional racks which engage rollers on the inner ends of the spindles.

Moisture, preferably water, which is automatically applied to the surfaces of the smooth spindles prior to their contact with the plants, causes the fibers of the open cotton bolls to adhere thereto and to become wound about the spindles as they rotate.

Opposite the picking side of the elongated path of the spindle carrier, are provided stripping means for removing from the spindles the cotton collected thereon, and suitable means for conveying this cotton to a receptacle from which it may be discharged at the convenient intervals.

The speed of travel of the spindle carrier, and the consequent movement of the spindles in the backward direction during contact with the plants, is approximately equal to the speed of the forward travel of the machine whereby the spindles, while in the plants, rotate in a position approximately stationary with relation to the plants.

Each unit 27 and 28 may embody the constructions and improvements of the Letters Patent aforesaid.

In using the embodiment of the invention shown in Figures 1 to 3, inclusive, one picker unit 27 operates on one row of cotton in advance of the second unit 28 which operates on a second row. The machine may be used to go over the rows but once, or one row may be picked over again by one unit while the other unit is passing along a new row. When two units are arranged tandem fashion, i. e., both to work on one row at a time (see Figure 4), both units may be rights or both lefts, as found most desirable.

When the tractor is converted to a wheel machine (Figures 5 and 6), units 27, 27', 28 may be located as shown in Figure 6, i. e., units 27—27' on opposite sides in front of the wheels 51, and unit 28 may be arranged tandem to a front unit (say 27). A single unit may be mounted on the tractor, in either the position of unit 27, or that of 27', or that of 28 if so desired.

To convert the track type machine (Figures 1 to 4) into a wheeled type (Figures 5 and 6) the track 8, wheels 7 and front standards 4 are removed. Wheels 51 are mounted on the rear standards 4 and provided with suitable sprockets 16 for chains 15, and a steering truck 49 is mounted on beam 3 and operated through conventional steering gear 50.

In order to prevent side and longitudinal sway of the picking units, suitable sway-preventing guide bars 52 and guide lugs 53 may be provided (see Figure 2) at any convenient location.

The picker drive-shafts 23 are connected by means of telescopic shafts 25 and universal joints 26 with a stub shaft mounted in suitable bearings and driven from a shaft 21 or 22 by bevel gears 24. Each shaft 21—22 is mounted in suitable bearings and is driven by a sprocket and chain drive 18 from the engine transmission shaft (see Figure 2). Suitable clutches 20 are provided in shafts 17, 21 and 22 so that either or all may be rendered operative or ineffective at will. The shaft 17 has universal joints 19.

A set of blowers 33—34, 35—36 is provided for each unit 27, 28, those for one unit being mounted at one side of the tractor, while those for the other unit are mounted at the other side, thus tending to balance the vehicle laterally. They are driven by belt and pulley drives 46, 47, 48 from the engine shaft so as to operate continuously while the engine is operating.

The main suction duct 37, 38 of a unit connects with its blower 33, 35, while the auxiliary duct 39, 40 connects with its blower 34, 36. Cotton from both blowers of a pair is conducted through a duct 41, 42 to a bag hanger 43—44 so as to deliver into the bags (see dotted lines, Figure 2), as will be clearly understood by reference to the aforesaid patents. The units 27—28 may be controlled as to elevation by means of a hand lever 45 suitably connected to the units.

Instead of locating the front face of the rear picking unit 28 flush with the rear face of the front picking unit as shown in Fig. 5, the casings of the units may be designed so that the front part of the rear unit overlaps the rear part of the front unit as far as possible, thereby (see Fig. 5) decreasing the combined length of the tandem picking units.

From the foregoing description, taken in connection with the accompanying drawings, it is thought that the construction, operation and advantages of the present invention will be apparent to those skilled in the art.

What I claim is:

A self-propelled tractor type machine, embodying an elevated frame track-type tractor designed to straddle a plurality of rows of plants, a right and a left picker unit of the character described, each unit having a plant tunnel and cotton picking mechanism operating on the plants as they are passed through the tunnels, said units being arranged in tandem, means to mount said units in position so the machine will operate on two rows of plants at a time, and means to mount said units below the frame of the tractor, said units being mounted with their principal combined weight disposed at one side of the central vertical plane of the tractor, cotton receivers mounted on the tractor and having their principal combined weight disposed at the other side of said plane, suction-blowers for conveying the cotton from one unit to one receiver, and other suction-blowers for conveying the cotton from the other unit to the other receiver, said blowers for the respective units being mounted on opposite sides of the machine for balancing purposes.

JOHN D. RUST.